Patented Oct. 21, 1941

2,259,483

UNITED STATES PATENT OFFICE 2,259,483

METHOD OF TREATING SULPHIDE PIGMENTS

Kenneth S. Mowlds, Baltimore, Md., assignor to The Glidden Company, Cleveland, Ohio, a corporation of Ohio No Drawing. Application April 24, 1939, Serial No. 269,787

10 Claims. (Cl. 106—295)

The present invention relates to sulphide pigments, and particularly relates to the treatment of sulphide pigments which discolor in paints which contain metallic driers.

In co-pending application Serial No. 175,246, filed November 18, 1937, there is disclosed a treatment of a base pigment with soluble silicates, followed by a precipitation of the silicate in insoluble form by means of precipitating salts and acids. It has been found, however, that when sulphide pigments such as lithopone are treated in this manner, particularly when the precipitating salt is calcium chloride or similar salt, that a darkening or discoloration takes place when the pigment is used in a paint containing lead, cobalt and other metallic driers, the discoloration being particularly objectionable in the case of lead driers.

This discoloration occurs even though the amount of precipitating salt used is stoichiometrically equivalent to the Na₂O contained in the sodium silicate. The discoloration is believed to be due to the presence of reactive calcium or similar salts, which results in the formation of colored sulphides of the metal contained in the drier. The possible reaction may be represented by the following equations although they are advanced only by way of theory to explain the reaction.

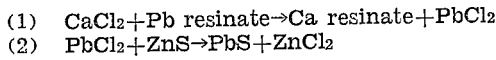

(1) $CaCl_2 + Pb\ resinate \rightarrow Ca\ resinate + PbCl_2$
(2) $PbCl_2 + ZnS \rightarrow PbS + ZnCl_2$ It appears that the $CaCl_2$ is adsorbed in some manner as repeated washing of the silicate treated pigment will not prevent discoloration, although it may be lessened somewhat.

According to the present invention a silicate treated sulphide pigment is provided which does not discolor when used in paints containing lead and similar driers. It has been found that if the occluded salts are converted into an inert non-reactive form, the reaction causing the formation of discoloring sulphides is prevented.

One method of accomplishing the desired result, is to convert the occluded salt into an inert non-reactive insoluble organic compound. Preferably this is accomplished by treating the pigment in slurry form with an organic compound, the reaction product of which with the occluded salts is an inactive relatively un-ionized compound. Organic compounds which are suitable for treatment of the pigment are proteins, water soluble proteinates, naphthenic acids, water soluble soaps, fatty acids, acid resins, and other organic compounds which will react with the occluded salts to form insoluble organic compounds.

In one example to 14,016 grams of lithopone in an aqueous slurry was added 350 cc. of a 40° Baumé sodium silicate solution and 87.5 grams of 75% calcium chloride. After agitation and the precipitation was complete, 56 grams of sodium caseinate dissolved in water was added. The pigment was then filtered and dried. The pigment was then used in making a white paint containing lead driers. The paint showed no noticeable discoloration after standing in the container, when observed with the unaided eye. The same lithopone treated with silicate in the same manner, but not given the proteinate treatment resulted in noticeable discoloration in the same paint formula after 48 hours which became greater with the passage of time, and eventually the paint became gray instead of white.

It is believed that the prevention of discoloration accomplished by the present invention is due to the fact that the calcium or other heavy metal is bound up and is in a non-reactive form. Accordingly it is not absolutely essential that the substance added to form the non-reactive metal compound be water soluble, as other expedients may be resorted to to effect the desired reaction. However, an aqueous solution is a convenient and practical way to accomplish the desired reaction and this procedure constitutes at least one phase of the present invention. The amount of organic material added to the pigment slurry will vary; ordinarily the amount will be between 0.1 and 0.4% by weight of the pigment. More, however, may be used but in such a case will not produce any useful result for the purposes of the present invention and will ordinarily be subsequently washed out, since only that amount is used which is insolubilized by the occluded salts present in the pigment.

Also other organic compounds than those mentioned and other proteins than casein may be used to convert the reactive salt or subtsance in the silicate treated pigment to the non-reactive form. Vegetable proteins such as soy bean protein, peanut proteins, etc. may be used. The invention is also applicable to sulphide pigments in which the silicate has been precipitated by other salts than calcium salts, such as other alkaline earth salts, aluminum salts, zinc salts, etc., and may be applied to sulphide pigments not necessarily containing a precipitated silicate, but which contains alkaline earth, aluminum, zinc and other easily ionizable compounds which are reactive and which, if present, cause discoloration when used in paints containing metallic driers, such as lead driers, etc. The invention is particularly applicable to white sulphide pigments such as lithopone or other zinc sulphide containing pigments, and light colored sulphide pigments such as cadmium sulphide, etc.

The invention in its broadest aspect is considered to reside in converting easily ionizable active metal compounds present in sulphide pigments which cause discoloration when used with metallic driers into a non-reactive organic compound.

Having described the invention what is claimed is:

1. The process of improving a pigment prepared by treating an aqueous slurry of a light colored sulphide pigment with an alkali metal silicate and a water soluble salt capable of precipitating said silicate in insoluble form, which comprises treating said pigment with an organic compound which reacts with easily ionizable salt occluded during the precipitation of the silicate to form a non-reactive relatively non-ionizable organic compound of said occluded salt.

2. The process of claim 1 in which the pigment comprises zinc sulphide.

3. The process of claim 1 in which the pigment is lithopone.

4. The process of improving a pigment prepared by treating an aqueous slurry of a light colored sulfide pigment with an alkali metal silicate and a water soluble salt capable of precipitating said silicate in insoluble form, which comprises treating said pigment with a water soluble proteinate, whereby easily ionizable salt occluded during the precipitation of the silicate is converted into a non-reactive relatively non-ionizable proteinate.

5. The process of claim 4 in which the pigment comprises zinc sulphide.

6. The process of claim 4 in which the pigment comprises lithopone.

7. The process of claim 1 as applied to pigments in which the occluded salt is a salt of an alkaline earth metal.

8. The process of claim 4 as applied to pigments in which the occluded salt is a salt of an alkaline earth metal.

9. The process of claim 4 in which the water soluble proteinate is an alkali proteinate.

10. The process of claim 1 in which the organic compound is a naphthenic acid.

KENNETH S. MOWLDS.